(12) United States Patent
Ougier

(10) Patent No.: US 9,121,396 B2
(45) Date of Patent: Sep. 1, 2015

(54) POSITIVE-DISPLACEMENT PUMP INCLUDING A PRESSURE ABSORBER

(75) Inventor: Christophe Ougier, Le Crest (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 198 days.

(21) Appl. No.: 13/266,098

(22) PCT Filed: Apr. 20, 2010

(86) PCT No.: PCT/FR2010/050763
§ 371 (c)(1),
(2), (4) Date: Mar. 12, 2012

(87) PCT Pub. No.: WO2010/122268
PCT Pub. Date: Oct. 28, 2010

(65) Prior Publication Data
US 2012/0164013 A1    Jun. 28, 2012

(30) Foreign Application Priority Data

Apr. 24, 2009 (FR) .................................... 09 52708

(51) Int. Cl.
| | |
|---|---|
| *F01C 20/18* | (2006.01) |
| *F04C 2/00* | (2006.01) |
| *F04C 14/18* | (2006.01) |
| *F04C 28/18* | (2006.01) |
| *F04B 1/12* | (2006.01) |
| *F04B 15/02* | (2006.01) |
| *F04B 1/18* | (2006.01) |
| *F04B 7/00* | (2006.01) |

(52) U.S. Cl.
CPC ................. *F04B 15/02* (2013.01); *F04B 1/184* (2013.01); *F04B 7/0023* (2013.01)

(58) Field of Classification Search
CPC ................ F04B 1/00; F04B 1/12; F04B 1/14; F04B 1/184; F04B 15/00; F04B 15/02; F04B 7/0019; F04B 7/0023
USPC ..................... 366/319, 82; 418/29, 201.1, 48; 417/205, 501, 539, 269, 201
See application file for complete search history.

(56) References Cited

U.S. PATENT DOCUMENTS

| | | | |
|---|---|---|---|
| 1,783,190 A  * | 12/1930 | Hertel ........................... | 202/118 |
| 3,477,097 A | 11/1969 | Plymale | |
| 4,155,969 A | 5/1979 | Hendry | |
| 4,256,453 A  * | 3/1981 | Csapo ........................... | 432/235 |
| 4,507,255 A  * | 3/1985 | Shizawa ........................ | 264/45.1 |
| 5,261,795 A  * | 11/1993 | Laurent et al. ................ | 417/205 |
| 5,655,891 A  * | 8/1997 | Deal et al. ..................... | 417/269 |

FOREIGN PATENT DOCUMENTS

FR        2 721 662        12/1995

* cited by examiner

*Primary Examiner* — Mary A Davis
*Assistant Examiner* — Deming Wan
(74) *Attorney, Agent, or Firm* — Cozen O'Connor

(57) ABSTRACT

The positive-displacement pump (10) includes a pump body (12) delimiting a rubber pressurizing chamber (14), and a feeder (16) for feeding the chamber (14) with rubber. The feeder (16) includes a worm (42) able to rotate about a main axis (X) with respect to the pump body (12) and an absorption body (50) that absorbs pressure in the pressurizing chamber (14) and is axially secured to the worm (42). The absorption body (50) is distinct from the worm (42), and has a surface (54) delimiting the pressurizing chamber (14) and arranged axially in line with the worm (42).

14 Claims, 2 Drawing Sheets

PRIOR ART

POSITIVE-DISPLACEMENT PUMP INCLUDING A PRESSURE ABSORBER

RELATED APPLICATIONS

This is a U.S. national stage of application No. PCT/FR2010/050763, filed on Apr. 20, 2010.

This application claims the priority of French application no. 09/52708 filed Apr. 24, 2009, the entire content of which is hereby incorporated by reference.

FIELD OF THE INVENTION

The present invention relates to the technical field of positive-displacement pumps for viscoelastic products, notably rubber for the manufacture of tyres.

BACKGROUND OF THE INVENTION

FR 2 721 662 already discloses a positive-displacement pump depicted in FIGS. 1A and 1B.

FIG. 1A illustrates the pump of the prior art empty and at rest. The positive-displacement pump 10' comprises a pump body 12' and a feeder 16' comprising a worm 42'. The worm 42' is able to rotate with respect to the body 12' about a main axis X'.

The positive-displacement pump 10' comprises a rubber pressurizing chamber 14' and two rubber metering chambers 18', 20' communicating with the pressurizing chamber 14'. Each metering chamber 18', 20' opens into a rubber flow passage 26', 28' which, in turn, opens into an intake chamber 32' of a rubber distribution member 30'.

The pump 10' also comprises two pistons 60', 62' able to move in the metering chambers 18', 20' between a top dead center and a bottom dead center with a cyclic reciprocating movement.

FIG. 1B illustrates the pump of the prior art containing rubber and in operation. When one of the pistons 60', 62' is at the top dead center, the rubber pressure in the pressurizing chamber 14' rises. Because of the reciprocating movement of the pump, the metering chambers 18', 20' are full at instants that cannot be predicted and that vary according to the fluidity of the rubber. This results in very great variations in pressure in the pressurizing chamber 14'.

The pressure is applied axially in the chamber 14' firstly to the worm 42' and secondly to part of the pump body 12' that is positioned axially in line with the worm 42'. This pressure is schematized by arrows in FIG. 1B. As a reaction to this increase in axial pressure, the pump body 12' becomes axially elongated by a length L1, whereas the worm 42' becomes axially compressed by a length L2.

The axial elongation L1 of the pump body 12' leads to a variation in the volumes of the metering chambers 18', 20' and of the flow passages 26', 28'. Further, the axial elongation L1 of the body 12' leads to an offset between the intake chamber 32' and each flow passage 26', 28'. Because rubber is not very compressible, the variation in these volumes and the offset therefore lead to a variation in the pressure and flow rate on the outlet side of the pump 10'.

SUMMARY OF THE INVENTION

It is an object of the invention to obtain a relatively uniform pump outlet flow rate.

To achieve this, one aspect of the invention is directed to a positive-displacement pump comprising a pump body delimiting a rubber pressurizing chamber, and a feeder for feeding the chamber with rubber, the feeder comprising a worm able to rotate about a main axis with respect to the pump body, wherein the feeder comprises an absorption body that absorbs the pressure of the pressurizing chamber and is axially secured to the worm and distinct from the worm, the absorption body having a surface delimiting the pressurizing chamber and arranged axially in line with the worm.

The positive-displacement pump according to the invention makes it possible to obtain a uniform outlet flow rate. Specifically, in the pump according to the invention, the increase in pressure is applied to the worm and to the absorption body. The pressure applied to the pump body in the pump of the prior art is absorbed by the feeder, particularly by that part of the feeder which lies between the absorption body and the worm of the pump according to the invention. Thus, the pressure applied by the rubber in the pressurizing chamber is applied to one and the same element, in this instance the feeder, more particularly to the worm and the absorption body. Because the absorption body is axially secured to the worm, only the feeder deforms in a limited or even non-existant way. The axial pressure applied by the rubber in the pressurizing chamber is therefore not applied to two elements that are capable of shifting axially relative to one another as in the pump of the prior art. With no axial elongation of the pump body, the metering chambers and the flow passages maintain their respective volumes thus making it possible to maintain a constant pressure and therefore a uniform outlet flow rate.

The surface is positioned axially in line with the worm, that is to say that the surface axially faces the worm, notably its thread, or alternatively that the worm, notably its thread, and the surface face one another axially.

With preference, the absorption body and the worm are of a single piece.

Advantageously, the pump body comprises a reception housing for the absorption body, in which housing the absorption body is able to move by sliding against the pump body.

It is thus possible easily to modify a pump of the prior art and convert it into a pump according to the invention. It is notably possible to keep the volume of the pressurizing chamber unchanged.

According to optional features of the pump according to the invention:

The pump comprises a rotary distribution member able to place a metering chamber in communication with a discharge chamber of the pump via an intake chamber of the distribution member.

The pump comprises at least one rubber metering piston able to move with respect to the pump body in the metering chamber, the distribution member being synchronized with each metering piston and/or with the feeder.

Each piston is able to move between:

a top dead center corresponding to a phase of discharging the rubber from the metering chamber to the discharge chamber, and a bottom dead center corresponding to a phase of intaking the rubber into the metering chamber from the pressurizing chamber.

The pump comprises first and second metering pistons able to move with respect to the pump body in first and second metering chambers respectively, with a cyclic reciprocating movement, preferably in phase-opposition.

The distribution member is able to rotate with respect to the pump body between:

a position of discharging the rubber from each first and second metering chamber, corresponding to the top dead center of each first and second piston, and a position of intaking the rubber into each first and second metering chamber, corresponding to the bottom dead center of each first and second piston respectively.

According to another optional feature:

the discharge position corresponds to the metering chamber and the discharge chamber being placed in communication with one another via the intake chamber, and the intake position corresponds to the pressurizing chamber and the metering chamber being placed in communication with each other.

A further aspect of the invention is directed to a rubber feeder for a positive-displacement pump comprising an axial rubber shearing part exhibiting symmetry of revolution about a main axis and an axial rubber distributing part, comprising an axial absorption part for absorbing the pressure applied by the rubber between the axial shearing part and the axial absorption part, the axial absorption part comprising an absorption body that has a surface positioned axially in line with the axial shearing part.

DETAILED DESCRIPTION OF THE DRAWINGS

Figures 1A, 1B:
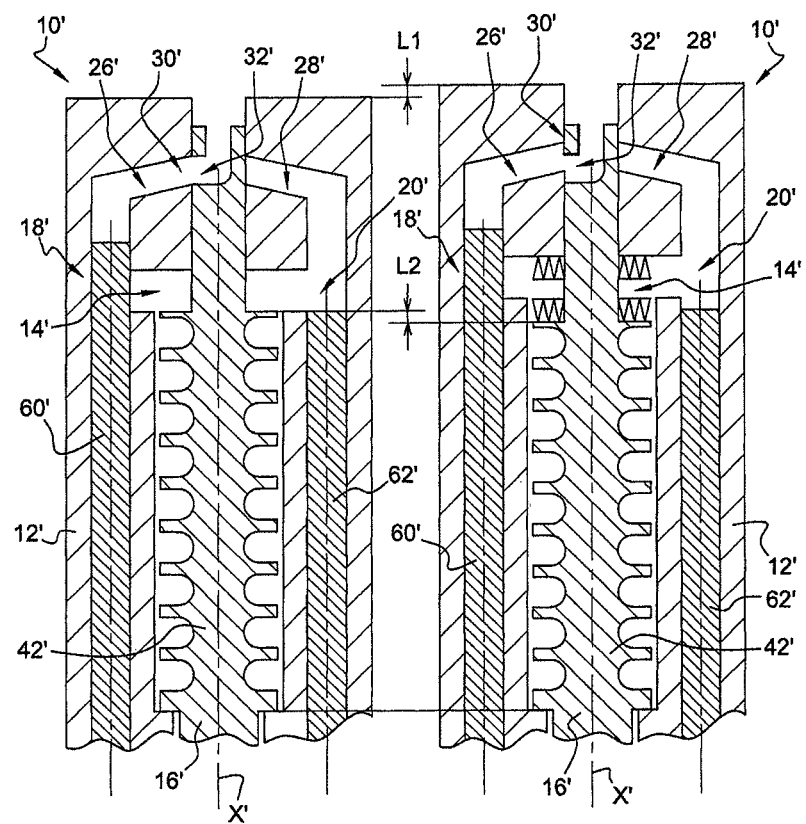
FIG. 1A depicts a prior art pump empty and at rest.
FIG. 1B depicts the prior art pump of FIG. 1A containing rubber and in operation.

The positive-displacement pump 10 can be used to meter rubber, notably rubber used for creating strips intended for the manufacture of tyres. The pump 10 comprises a pump body 12 delimiting a pressurizing chamber 14 that pressurizes the rubber. The pump 10 also comprises a feeder 16, arranged in the body 12.

The pump 10 comprises first and second rubber metering chambers 18, 20 communicating with the pressurizing chamber 14 via communicating ports 22 and 24.

Each metering chamber 18, 20 opens into a respective rubber flow passage 26, 28.

Each passage 26, 28 opens into a rubber distribution member 30. The member 30 comprises an inlet passage 31 that lets the rubber into the member 30. This passage 31 forms a rubber intake chamber 32. The intake chamber 32 or passage 31 comprises a radial inlet 34 formed on the periphery of the member 30, and an axial outlet 36 formed at an axial end of the member 30.

The intake chamber 32 opens into a discharge chamber 38 for discharging the rubber to the outside of the pump 10. The intake chamber 32 is arranged in such as way as to place each passage 26, 28 in communication with the discharge chamber 38.

The feeder 16 is able to turn about a main axis X with respect to the body 12. For that purpose, the body 12 comprises a substantially cylindrical sleeve 40 in which the feeder 16 turns. The feeder 16 is axially fixed with respect to the body 12.

The element 16 comprises a threaded axial shearing part 42 forming a worm intended to mix the rubber and bring it up to temperature. The part 42 comprises a thread 44.

The feeder 16 also comprises an axial rubber distribution part 46 for distributing the rubber from the pump 10 to the outside thereof. The axial part 46 notably comprises the member 30.

Further, the feeder 16 comprises an axial pressure absorption part 48 for absorbing the pressure applied by the rubber between the axial part 42 and the axial part 48, and which is interposed axially between the shearing 42 and distribution 46 parts. The axial absorption part 48 is distinct from the parts 42 and 46.

The axial absorption part 48 comprises a pressure absorption body 50 that absorbs the pressure of the rubber in the chamber 14. The body 50 is axially and tangentially secured to the worm 42. The body 50 and the worm 42 in this instance are made as a single piece which means that the body 50 is able to rotate about the axis X with respect to the body 12. The body 50 is of a substantially cylindrical shape with symmetry of revolution about the axis X and is shaped so that the chamber 14 is axially interposed between the worm 42 and the body 50. The body 50 is distinct from the body 12, from the worm 42 and from the member 30.

The body 50 is in contact with the pump body 12. The pump body 12 comprises a reception housing 51 receiving the absorption body 50 and in which the latter is able to move by sliding against the pump body 12.

The chamber 14 is delimited firstly by the pump body 12 and secondly by the absorption body 50. In this particular instance, the chamber 14 is delimited by surfaces 52 of the pump body 12 and a surface 54 of the absorption body 50.

The surfaces 52 of the pump body comprise surfaces 52a, 52b radially guiding the rubber towards the metering chambers 18, 20 and a surface 56 of the sleeve 40 for axially guiding the rubber. The surfaces 52a, 52b face one another on each side of the chamber 14. The surfaces 52a, 52b and 54 experience a substantially axial pressure, whereas the surface 56 experiences a substantially radial pressure.

Figure 2:
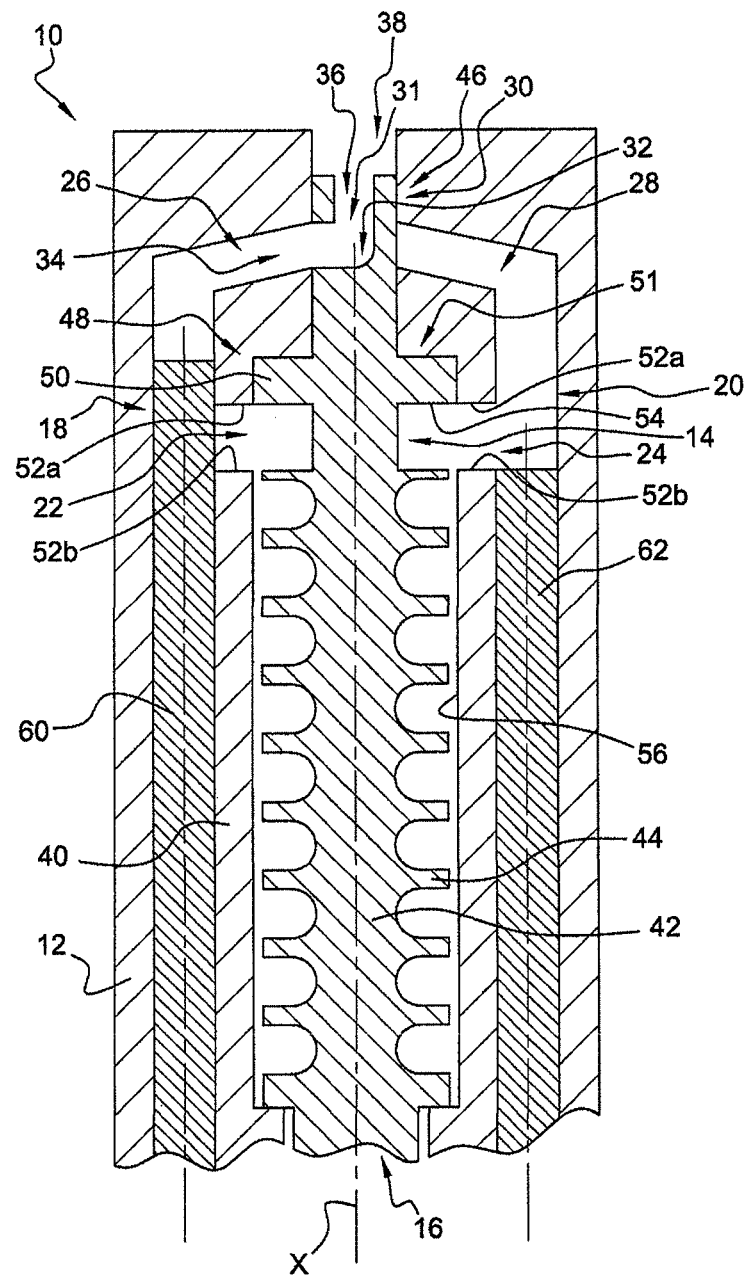
FIG. 2 depicts a positive-displacement pump according to an embodiment of the invention and is denoted by the overall reference 10.

The surface 54 of the absorption body is positioned axially in line with the axial shearing part, in this instance the worm 42, and with the sleeve 40. In other words, the surface 54 axially faces the worm 42 and the sleeve 40. As depicted in FIG. 2, the surface 54 is positioned axially in line with the thread 44, which means to say that the surface 54 and the thread 44 axially face one another. The absorption body 50 is arranged axially between the pump body 12 and the chamber 14 in contact with the body 12 so that the feeder 16 absorbs the axial pressure applied by the rubber between the worm 42, in this instance the thread 44, and the absorption body 50, in this instance the surface 54, in the pressurizing chamber 14. The radial dimension of the absorption body 50 is greater than or equal to the radial dimension of the worm 42 so that the worm 42 is positioned axially in line with the only surface 54. The radial dimension, in this instance the diameter of the body 50, is substantially equal to the radial dimension of the sleeve 40 or of the worm 42. In this particular instance, the diameter of the body 50 is substantially equal to the diameter of the sleeve 40 so that the surface 54 does not face any surface of the pump body 12. Thus, the worm 42, in this instance the thread 44, is arranged in such a way that the worm 42, in this instance the thread 44, is arranged axially in line with only the surface 54. The surface 54 is arranged so that it is substantially not positioned axially in line with the pump 10 of the body 12, and so that the surface 54 is positioned axially in line only with the worm 42, in this instance the thread 44. The axial pressure applied by the rubber between the body 50 and the thread 44 is completely absorbed by the feeder 16. Each surface 52a is positioned in line with the surface 52b. The surface 54 and the thread 44 form two axial end stops opposite one another and absorb the pressure applied by the rubber between these two end stops.

Furthermore, the pump 10 comprises first and second pistons 60, 62 able to move respectively in the metering chambers 18, 20 between:
- a top dead center (piston 60 in FIG. 2) corresponding to a phase of discharging rubber from the metering chamber 18 to the discharge chamber 34, and
- a bottom dead center (piston 62 in FIG. 2), corresponding to a phase of intaking rubber into the metering chamber 20 from the pressurizing chamber 14.

The pistons 60, 62 are able to move with a cyclic reciprocating movement in phase-opposition, which means to say that each piston 60, 62 oscillates between the top and bottom dead centers and that when one of the pistons 60, 62 is in the top dead center, the other piston 62, 60 is in the bottom dead center. When each piston 60, 62 is at the top dead center, it delimits the pressurizing chamber 14.

The distribution member 30 is able to rotate about the axis X with respect to the body of the pump 10, between:
- a discharge position (the position of the member 30 with respect to the chamber 18 and of the piston 60 in FIG. 2) for discharging rubber from each metering chamber 18, 20, corresponding to the top dead center of each piston 60, 62, and
- an intake position (position of the member 30 with respect to the chamber 20 and of the piston 62 in FIG. 2) for intaking rubber into each metering chamber 18, 20 corresponding to the bottom dead center of each piston 60, 62.

The distribution member 30 is synchronized to each metering piston 60, 62. Thus, the discharge position corresponds to the metering chamber 18, 20 being placed in communication with the discharge chamber 34 via the intake chamber 32. The intake position corresponds to the pressurizing chamber 14 being placed in communication with the metering chamber 18, 20.

The invention claimed is:

1. An elongated rubber feeder adapted to be operatively coupled to a positive-displacement pump having a pump body at least partly delimiting a rubber pressurizing chamber, the rubber feeder having an axis arranged axially within the pump body along a main axis of the pump body, the feeder comprising:
    a threaded worm rotatable about the main axis with respect to the pump body, and
    an absorption body configured to absorb the pressure of the rubber pressurizing chamber,
    wherein the absorption body is axially secured to and in line with the worm and configured to rotate together with the worm, the absorption body having a bottom face that oppositely faces a top face of a top thread of the worm, the bottom face of the absorption body and the top face of the top thread of the worm being spaced apart so as to delimit the rubber pressurizing chamber, the absorption body being in contact with the pump body.

2. The rubber feeder according to claim 1, wherein the absorption body is cylindrical and the radial dimension of the cylindrical absorption body is greater than the radial dimension of the worm.

3. A positive-displacement pump comprising:
    a pump body at least partially delimiting a rubber pressurizing chamber; and
    a feeder configured to feed the rubber pressurizing chamber with rubber, the feeder having:
        a threaded worm rotatable about a main axis with respect to the pump body, and
        an absorption body configured to absorb the pressure of the rubber pressurizing chamber,
    wherein the absorption body is axially secured to and in line with the worm and configured to rotate together with the worm, the absorption body having a bottom face that oppositely faces a top face of a top thread of the worm, the bottom face of the absorption body and the top face of the top thread of the worm being spaced apart so as to delimit the rubber pressurizing chamber, the absorption body being in contact with the pump body.

4. The pump according to claim 3, wherein the absorption body and the worm are of a single piece.

5. The pump according to claim 3, wherein the pump body comprises a reception housing for the absorption body, in which housing the absorption body is movable by sliding against the pump body.

6. The pump according to claim 5, wherein the reception housing has upper and lateral surfaces upstream of the rubber pressurizing chamber, and lower surfaces, the lower surfaces at least partly delimiting the rubber pressurizing chamber.

7. The pump according to claim 3, the pump body further delimiting a metering chamber and a discharge chamber, and further comprising a rotary distribution member having an intake chamber, the rotary distribution member being configured to place the metering chamber in communication with the discharge chamber via the intake chamber.

8. The pump according to claim 7, further comprising at least one rubber metering piston movable with respect to the pump body in the metering chamber, the rotary distribution member being synchronized with each metering piston and/or with the feeder.

9. The pump according to claim 8, wherein each said at least one rubber metering piston is movable between:
    a top dead center corresponding to a phase of discharging the rubber from the metering chamber to the discharge chamber, and
    a bottom dead center corresponding to a phase of intaking the rubber into the metering chamber from the rubber pressurizing chamber.

10. The pump according to claim 8, wherein the at least one rubber metering piston comprises first and second metering pistons movable with respect to the pump body in first and second metering chambers, respectively, with a cyclic reciprocating movement.

11. The pump according to claim 10, wherein the cyclic reciprocating movement is in phase-opposition.

12. The pump according to claim 8, wherein each said at least one rubber metering piston is movable between a top dead center corresponding to a phase of discharging the rubber from the metering chamber to the discharge chamber, and a bottom dead center corresponding to a phase of intaking the rubber into the metering chamber from the rubber pressurizing chamber; and
    wherein the pump comprises first and second metering pistons movable with respect to the pump body in first and second metering chambers respectively, with a cyclic reciprocating movement, and in which the distribution member is rotatable with respect to the pump body between:
        a position of discharging the rubber from each first and second metering chamber, corresponding to the top dead center of each first and second piston respectively, and
        a position of intaking the rubber into each first and second metering chamber, corresponding to the bottom dead center of each first and second piston respectively.

13. The pump according to claim 12, wherein:
the discharge position corresponds to the metering chamber and the discharge chamber being placed in communication with one another via the intake chamber, and
the intake position corresponds to the rubber pressurizing chamber and the metering chamber being placed in communication with each other.

14. The pump according to claim 3, wherein the absorption body is cylindrical and the radial dimension of the cylindrical absorption body is greater than the radial dimension of the worm.

\* \* \* \* \*